(12) United States Patent
Fung

(10) Patent No.: US 12,430,937 B2
(45) Date of Patent: Sep. 30, 2025

(54) WINE PRODUCT POSITIONING METHOD, WINE PRODUCT INFORMATION MANAGEMENT METHOD AND APPARATUS, DEVICE, AND STORAGE MEDIUM

(71) Applicant: Kar Hey Anthony Fung, Hong Kong (CN)

(72) Inventor: Kar Hey Anthony Fung, Hong Kong (CN)

( * ) Notice: Subject to any disclaimer, the term of this patent is extended or adjusted under 35 U.S.C. 154(b) by 386 days.

(21) Appl. No.: 18/127,006

(22) Filed: Mar. 28, 2023

(65) Prior Publication Data

US 2023/0237825 A1 Jul. 27, 2023

Related U.S. Application Data

(63) Continuation of application No. PCT/CN2020/123637, filed on Oct. 26, 2020.

(30) Foreign Application Priority Data

Sep. 28, 2020 (CN) .......................... 202011040743.3

(51) Int. Cl.
*G06V 30/19* (2022.01)
*G06T 7/70* (2017.01)
*G06V 20/62* (2022.01)

(52) U.S. Cl.
CPC .............. *G06V 30/191* (2022.01); *G06T 7/70* (2017.01); *G06V 20/62* (2022.01); *G06V 30/19013* (2022.01); *G06T 2200/24* (2013.01); *G06T 2207/20081* (2013.01)

(58) Field of Classification Search
CPC .................................. G06T 7/70; G06V 20/62
See application file for complete search history.

(56) References Cited

U.S. PATENT DOCUMENTS

| | | | |
|---|---|---|---|
| 2007/0162358 A1* | 7/2007 | Banerjee | G07F 9/105 705/28 |
| 2009/0259571 A1* | 10/2009 | Ebling | G06Q 50/40 705/28 |
| 2018/0204111 A1* | 7/2018 | Zadeh | G06V 10/764 |

* cited by examiner

*Primary Examiner* — Edward Park

(57) ABSTRACT

Disclosed are a wine product positioning method, a wine product information management method and apparatus, a computer device, and a computer-readable storage medium. Based on a preset camera in a wine cellar, a wine product image captured by the preset camera and corresponding to a target wine product is acquired (S21). Based on a preset wine label recognition method combining optical character recognition (OCR) and deep learning recognition, the wine product image is recognized to obtain a wine label corresponding to the wine product image (S22). A preset capture position corresponding to the camera is acquired, and the preset capture position is taken as a current position corresponding to the target wine product (S23). A position corresponding to the target wine product is described by using the wine label and the current position, to position the target wine product (S24).

6 Claims, 3 Drawing Sheets

WINE PRODUCT POSITIONING METHOD, WINE PRODUCT INFORMATION MANAGEMENT METHOD AND APPARATUS, DEVICE, AND STORAGE MEDIUM

CROSS-REFERENCE TO RELATED APPLICATIONS

This application is based on and claims priority to Chinese Patent Application No. 202011040743.3 filed on Sep. 28, 2020, which is incorporated in this application by reference in its entirety.

TECHNICAL FIELD

This application relates to the field of wine product information management technologies, and in particular, to a wine product positioning method, a wine product information management method and apparatus, a computer device, and a computer-readable storage medium.

BACKGROUND

Alcohol has played an important role in society since ancient times. For example, wine is playing an increasingly important role in modern society. The alcohol is generally stored in wine cellars. For the storage of the alcohol, a specific environmental condition is required for the wine cellars, and wine products in the wine cellars need to be managed. For example, for storage of the wine, requirements are extremely strict especially for a temperature and humidity, and for conventional red wine cellars, due to functional limitations of the wine cellars, red wine products stored in the wine cellars are mainly manually managed. To automate the management of the wine products in the wine cellars, there is a need to manage the wine products according to locations of the wine products in the wine cellars. That is, there is a need to position the wine products in the wine cellars. However, in the conventional technology, due to the inability to accurately and automatically position the wine products in the wine cellars, automatic management of the wine products is inefficient.

SUMMARY

This application provides a wine product positioning method, a wine product information management method and apparatus, a computer device, and a computer-readable storage medium, which can solve the problem of low accuracy of positioning of the wine products in the wine cellars in the conventional technology, so as to solve the problem of inefficient automatic management of the wine products through the wine cellars in the conventional technology.

In a first aspect, this application provides a wine product positioning method, including: acquiring, based on a preset camera in a wine cellar, a wine product image captured by the preset camera and corresponding to a target wine product; recognizing, based on a preset wine label recognition method combining optical character recognition (OCR) and deep learning recognition, the wine product image to obtain a wine label corresponding to the wine product image; acquiring a preset capture position corresponding to the camera, and taking the preset capture position as a current position corresponding to the target wine product; and describing a position corresponding to the target product by using the wine label and the current position, to position the target wine product.

In a second aspect, this application provides a wine product information management method applied to a server side, the method including: acquiring wine product information, the wine product information including a wine product image; positioning, according to the wine product positioning method, a wine product corresponding to the wine product image to obtain a target position corresponding to the wine product; and managing the wine product information based on the target position.

In a third aspect, this application provides a wine product information management method applied to a terminal, the method including: sending, in response to an operation of a user, a wine product information acquisition request to a preset server, so that the preset server acquires target wine product information corresponding to the wine product information acquisition request according to the wine product information acquisition request and returns the target wine product information to the terminal, where the target wine product information includes wine product information associated based on a wine product position corresponding to a wine product, the wine product position being a position of the wine product obtained by positioning the wine product according to the wine product positioning method; receiving the target wine product information sent by the preset server; and displaying the target wine product information so that the user acquires the target wine product information.

In a fourth aspect, this application further provides a wine product positioning apparatus, including: a first acquisition unit configured to acquire, based on a preset camera in a wine cellar, a wine product image captured by the preset camera and corresponding to a target wine product; a recognition unit configured to recognize, based on a preset wine label recognition method combining OCR and deep learning recognition, the wine product image to obtain a wine label corresponding to the wine product image; a second acquisition unit configured to acquire a preset capture position corresponding to the camera, and take the preset capture position as a current position corresponding to the target wine product; and a first positioning unit configured to describe a position corresponding to the target wine product by using the wine label and the current position, to position the target wine product.

In a fifth aspect, this application further provides a wine product information management apparatus applied to a server side, the apparatus including: a third acquisition unit configured to acquire wine product information, the wine product information including a wine product image; a second positioning unit configured to position, according to the wine product positioning method, a wine product corresponding to the wine product image to obtain a target position corresponding to the wine product; and a management unit configured to manage the wine product information based on the target position.

In a sixth aspect, this application further provides a wine product information management apparatus applied to a terminal, the apparatus including: a sending unit configured to send, in response to an operation of a user, a wine product information acquisition request to a preset server, so that the preset server acquires target wine product information corresponding to the wine product information acquisition request according to the wine product information acquisition request and returns the target wine product information to the terminal, where the target wine product information includes wine product information associated based on a wine product position corresponding to a wine product, the wine product position being a position of the wine product obtained by positioning the wine product according to the wine product positioning method; a receiving unit configured to receive the target wine product information sent by the preset server; and a display unit configured to display the target wine product information so that the user acquires the target wine product information.

In a seventh aspect, this application further provides a computer device, including a memory and a processor, the memory storing a computer program, and the processor, when executing the computer program, performing steps of the wine product positioning method, or performing steps of the wine product information management method applied to a server side, or performing steps of the wine product information management method applied to a terminal.

In an eighth aspect, this application further provides a computer-readable storage medium, the computer-readable storage medium storing a computer program, the computer program, when executed by a processor, causing the processor to implement steps of the wine product positioning method, or implement steps of the wine product information management method applied to a server side, or implement steps of the wine product information management method applied to a terminal.

This application provides a wine product positioning method, a wine product information management method and apparatus, a computer device, and a computer-readable storage medium. According to this application, based on the preset camera in the wine cellar, the wine product image captured by the preset camera and corresponding to the target wine product is acquired. Based on the preset wine label recognition method combining OCR and deep learning recognition, the wine product image is recognized to obtain the wine label corresponding to the wine product image. The preset capture position corresponding to the camera is acquired, and the preset capture position is taken as the current position corresponding to the target wine product. The position corresponding to the target wine product is described by using the wine label and the current position, to position the target wine product. Based on the preset wine label recognition method combining OCR and deep learning recognition, in an environment of a complex wine cellar, wine labels included in wine product images can be accurately and quickly recognized, so that accurate positioning of wine products can be realized according to the recognized wine labels in combination with layout of a preset camera in the wine cellar, so as to perform precise automatic management on the wine products in the wine cellar, which prevents confusion and errors in the automatic management of the wine products in the wine cellar due to an error in recognition of the wine labels, and improves efficiency and quality of automatic management of the wine products in the wine cellar. For example, in a wine cellar where red wine is stored, through accurate positioning of red wine products, real-time, automatic, and high-quality management of the red wine can be performed, thereby improving efficiency of automatic management of the red wine.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DETAILED DESCRIPTION

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

It should be understood that the terms "include" and "comprise", when used in the specification and the appended claims, specify the presence of described features, entireties, steps, operations, elements, and/or components, but do not preclude the presence or addition of one or more other features, entireties, steps, operations, elements, components, and/or combinations thereof.

Figure 1:
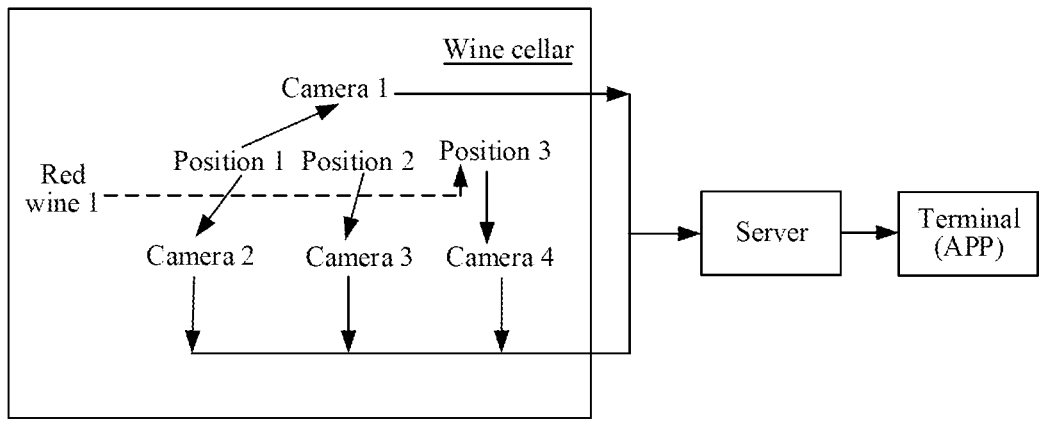
FIG. 1 is a diagram of an application environment of a wine product positioning method according to an embodiment of this application.

Referring to FIG. 1, FIG. 1 is a diagram of an application environment of a wine product positioning method according to an embodiment of this application. As shown in FIG. 1, the application environment includes: (1) Wine cellar. A plurality of cameras are provided at different positions in the wine cellar. As shown in FIG. 1, a camera 1, a camera 2, a camera 3, and a camera 4 are disposed in the wine cellar of this example to shoot wine products in the wine cellar. Still referring to FIG. 1, in the example, a position 1, a position 2, and a position 3 are included, the camera 1 and the camera 2 are configured to shoot the position 1, the camera 3 is configured to shoot the position 2, and the camera 4 is configured to shoot the position 3. Red wine 1 may be a wine product in a wine cabinet at a storage position 1, 2, or 3. At the same time, the red wine 1 may also be a wine product that enters or exits the wine cellar. For example, as shown in FIG. 1, the red wine 1, after entering the wine cellar, passes through the position 1 and the position 2 to reach the position 3, so as to be placed at the position 3. Wine product information corresponding to the red wine 1 is automatically managed on the basis of recognition of a wine label corresponding to the red wine 1 in combination with the position 3 where the red wine 1 is located. (2) Server. The server is configured to receive a wine product image shot and uploaded by the camera and corresponding to the red wine 1, perform wine label recognition on the wine product image, and manage wine product information of the wine product corresponding to the red wine 1 according to a wine label recognition result corresponding to the wine label recognition in combination with preset capture positions corresponding to the camera 1, the camera 2, the camera 3, and the camera 4, especially the position 3 corresponding to the camera 4 at which the red wine finally stays. (3) Terminal. The terminal is configured to receive a user's query, edition, deletion, or other operations on the wine product information corresponding to the red wine 1, and in response to the operation of the user, acquire the wine product information corresponding to the red wine 1 corresponding to the operation of the user from the server. The wine product information may be operated through a wine information management APP installed on the terminal.

Operation processes of the above subjects are as follows: 1) The cameras in the wine cellar capture wine product images corresponding to a wine product in the wine cellar and upload the wine product images to the server. For example, in FIG. 1, the camera 1 and the camera 2 shoot a red wine product image 1 corresponding to the red wine 1 at the position 1, the camera 3 shoots a red wine product image 2 corresponding to the red wine 1 at the position 2, the camera 4 shoots a red wine product image 3 corresponding to the red wine 1 at the position 3, and the red wine product image 1, the red wine product image 2, and the red wine product image 3 are uploaded to the server. 2) The server receives the wine product information. The wine product information includes a wine product image. For example, the red wine product image 1, the red wine product image 2, or the red wine product image 3 is received. After the wine product image is acquired, the wine product image is recognized based on the preset wine label recognition method combining OCR and deep learning recognition to obtain a wine label corresponding to the wine product image, and then preset capture positions corresponding to the cameras are acquired. Preset capture positions corresponding to wine products shot by the cameras may be acquired through a preset corresponding relationship between the cameras and positions. For example, the wine product shot through the camera 1 and the camera 2 corresponds to the position 1, and shot through the camera 3 corresponds to the position 2. Alternatively, a position image shot by a camera may be recognized to recognize a preset capture position corresponding to a shot wine product. For example, after an image shot by the camera 2 and including the position 1 is received, the image is recognized to recognize that a position corresponding to the image is the position 1, a position number corresponding to the position 1 may be recognized, and the preset capture position is taken as a current position corresponding to the target wine product. A position corresponding to the target wine product is described by using the wine label and the current position, to position the target wine product. Wine product information management (such as record, delete, and edit) is performed on wine product information of the wine product corresponding to the wine product image. 3) In response to an operation of a user, a wine product information acquisition request is sent to a preset server, so that the preset server acquires target wine product information corresponding to the wine product information acquisition request according to the wine product information acquisition request, and returns the target wine product information to the terminal. The target wine product information includes wine product information associated based on a wine product position corresponding to a wine product, and the wine product position is a position of the wine product obtained by positioning the wine product according to the wine product positioning method. The terminal receives the target wine product information sent by the preset server and displays the target wine product information, to enable the user to acquire the target wine product information.

Figure 2:
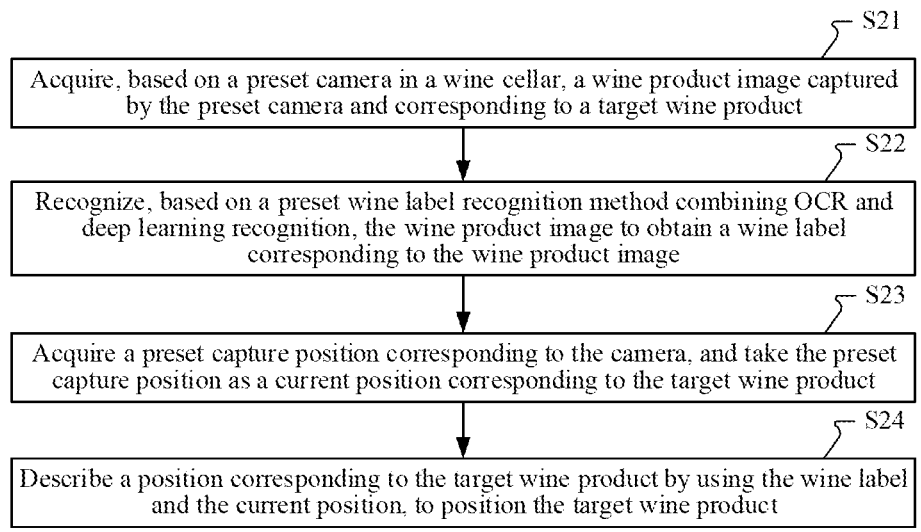
FIG. 2 is a schematic flowchart of a wine product positioning method according to an embodiment of this application.

Referring to FIG. 2, FIG. 2 is a schematic flowchart of a wine product positioning method according to an embodiment of this application. As shown in FIG. 2, the method includes the following steps S21 to S24:

S21: Acquire, based on a preset camera in a wine cellar, a wine product image captured by the preset camera and corresponding to a target wine product.

Specifically, automatic management of a wine product in a wine cellar may involve positioning the wine product to obtain a position of the wine product. Wine product information corresponding to the wine product is automatically managed according to the position of the wine product. Cameras may be disposed at different positions in the wine cellar according to actual requirements for wine product shooting, so as to shoot wine products in the wine cellar through the cameras. For example, storing wine in or taking wine out of a wine cabinet may be shot, or storing wine in or taking wine out of the wine cellar may be shot. The cameras upload wine product images corresponding to shot wine products to a computer device for wine product positioning, to enable the computer device to acquire the wine product image captured by the preset camera and corresponding to the target wine product. The wine product image shot by the camera may be a picture or a video. If the cameras shoot a video, there is a need to extract video frames from the video to obtain the wine product image corresponding to the wine product.

S22: Recognize, based on a preset wine label recognition method combining OCR and deep learning recognition, the wine product image to obtain a wine label corresponding to the wine product image.

Specifically, when automatic positioning of a wine product in the wine cellar is required, a wine label to which the wine product belongs needs to be recognized, that is, what kind of wine the wine product is, and then the wine product is automatically positioned in combination with a position of the wine product in the wine cellar. After the wine product image corresponding to the target wine product is acquired, image recognition is performed on the wine product image to recognize a wine label included in the wine product image, so as to obtain the wine label corresponding to the wine product image. In the embodiments of this application, when wine label recognition is performed on the wine product image, the wine product image is recognized based on the preset wine label recognition method combining OCR and deep learning recognition to obtain the wine label corresponding to the wine product image. Since text of normative characters included in an image can be quickly and accurately recognized through OCR and the image can be accurately recognized through deep learning recognition, the wine label included in the wine product image can be quickly and accurately recognized based on the preset wine label recognition method combining OCR and deep learning recognition, which improves accuracy and efficiency of recognition of the wine label included in the wine product image.

S23: Acquire a preset capture position corresponding to the camera, and take the preset capture position as a current position corresponding to the target wine product.

Specifically, when the wine product in the wine cellar is automatically positioned, the wine label to which the wine product belongs needs to be recognized, that is, what kind of wine the wine product is, and then the wine product is automatically managed in combination with a position corresponding to the wine product, that is, a wine product position, obtained by automatically positioning the wine product according to the position of the wine product in the wine cellar. The position of the wine product in the wine cellar, that is, the preset capture position corresponding to the camera, may be realized in the following two manners:

1) The position may be acquired through a fixed preset capture position corresponding to the camera in the wine cellar. That is, a preset capture position is pre-fixed for each camera, the preset capture position corresponding to the camera is acquired according to the camera through a corresponding relationship between cameras and fixed preset capture positions, and the preset capture position corresponding to the camera may be determined through the camera, so as to obtain the preset capture position corresponding to the camera. For example, a camera A is disposed at a position A in the wine cellar, and an image at a position B in the wine cellar is shot through the camera A. If a wine product image shot by the camera A is received, it may be known that a wine product corresponding to the wine product image is at the position B in the wine cellar. Therefore, after the wine product image corresponding to the target wine product captured by the preset camera is acquired, a position of the wine product corresponding to the wine product image in the wine cellar when the wine product image is shot may be obtained according to the preset capture position corresponding to the camera uploading the wine product image, and the preset capture position is taken as the current position corresponding to the target wine product.

2) The preset capture position corresponding to the camera may be acquired by image detection. That is, a camera is disposed correspondingly at each wine product placement position, and the placement position is shot through the camera. For example, a position identifier corresponding to the placement position is shot. The position identifier may be a position number. When it is detected that a wine product is at the placement position, an image corresponding to the placement position is shot and acquired through the camera, and then image detection is performed on the image corresponding to the placement position to recognize the placement position. For example, a camera A is disposed at a position A in the wine cellar, and an image at a position B where a wine product is placed in the wine cellar is shot through the camera A. During the positioning of the wine product, if an image including the position B is shot through the camera, after the image shot by the camera A and including the position B is received, image recognition is performed on the image including the position B to recognize the position B, and it may be known that the position of the wine product corresponding to the wine product image in the wine cellar is the position B, so as to acquire the preset capture position corresponding to the camera.

S24: Describe a position corresponding to the target wine product by using the wine label and the current position, to position the target wine product.

Specifically, after the wine label included in the wine product image and the current position of the wine product corresponding to the wine product image in the wine cellar, the position corresponding to the target wine product may be described by using the wine label and the current position, to position the target wine product. For example, if a wine label included in a wine product image corresponding to a target wine product is M and a position of the target wine product corresponding to the wine product image in the wine cellar is L, the target wine product in the wine cellar may be positioned as: the wine product M being at the position L in the wine cellar. Based on the preset wine label recognition method combining OCR and deep learning recognition, in an environment of a complex wine cellar, wine labels included in wine product images can be accurately and quickly recognized, so that accurate positioning of wine products can be realized according to the recognized wine labels in combination with positions of the wine products in the wine cellar, so as to perform precise automatic management on the wine products in the wine cellar, which prevents confusion and errors in the automatic management of the wine products in the wine cellar due to an error in recognition of the wine labels, and improves efficiency and quality of automatic management of the wine products in the wine cellar.

According to this application, based on the preset camera in the wine cellar, the wine product image captured by the preset camera and corresponding to the target wine product is acquired. Based on the preset wine label recognition method combining OCR and deep learning recognition, the wine product image is recognized to obtain the wine label corresponding to the wine product image. The preset capture position corresponding to the camera is acquired, and the preset capture position is taken as the current position corresponding to the target wine product. The position corresponding to the target wine product is described by using the wine label and the current position, to position the target wine product. Based on the preset wine label recognition method combining OCR and deep learning recognition, in an environment of a complex wine cellar, wine labels included in wine product images can be accurately and quickly recognized, so that accurate positioning of wine products can be realized according to the recognized wine labels in combination with layout of a preset camera in the wine cellar, so as to perform precise automatic management on the wine products in the wine cellar, which prevents confusion and errors in the automatic management of the wine products in the wine cellar due to an error in recognition of the wine labels, and improves efficiency and quality of automatic management of the wine products in the wine cellar. For example, in a wine cellar where red wine is stored, through accurate positioning of red wine products, real-time, automatic, and high-quality management of red wine can be performed, thereby improving efficiency of automatic management of the red wine.

Figure 3:
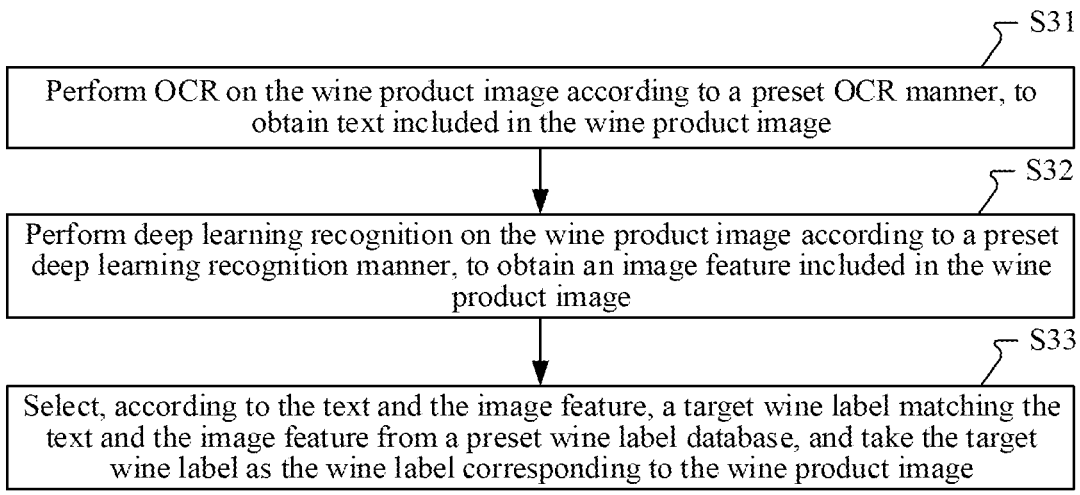
FIG. 3 is a first schematic sub-flowchart of a wine product positioning method according to an embodiment of this application.

Referring to FIG. 3, FIG. 3 is a first schematic sub-flowchart of a wine product positioning method according to an embodiment of this application. As shown in FIG. 3, in this embodiment, the step of recognizing, based on a preset wine label recognition method combining OCR and deep learning recognition, the wine product image to obtain a wine label corresponding to the wine product image includes the following steps S31 to S33:

S31: Perform OCR on the wine product image according to a preset OCR manner, to obtain text included in the wine product image.

The OCR is to optically convert text in a document into a black-and-white dot matrix image file and convert text in an image into a text format through recognition software.

Specifically, in the case of wine label recognition, wine product images in a wine cellar are captured through cameras disposed in the wine cellar, and the wine product images are uploaded to a computer device for wine label recognition, so that the computer device acquires a to-be-recognized wine product image, and then the computer device performs OCR on the wine product image in a preset OCR manner to extract text included in the wine product image and takes the text as target text. Since an OCR technology is good at recognizing character content such as standard text, the text included in the wine product image can be accurately recognized. For example, when a wine label of red wine in a red wine cellar is automatically recognized to manage red wine product information, in the red wine cellar, a wine product image of a red wine product may be shot through a plurality of cameras deployed in the red wine cellar, where the wine product image may be a single image (i.e., a picture in an image format) shot through the camera, and the wine product image is uploaded to a backend red wine product information server. Alternatively, the wine product image may be a video captured through the camera, the video captured through the camera is uploaded to the backend red wine product information server, and then a video frame in the video is extracted to obtain an image. The backend red wine product information server performs OCR on the wine product image in a preset OCR manner to obtain text included in the wine product image, and takes the text as target text corresponding to the wine label.

Further, before the step of acquiring a wine product image, the method further includes:

acquiring an initial wine product image corresponding to the wine product image; and segmenting the initial wine product image to obtain a wine product image corresponding to a local image including a preset wine label in the initial wine product image.

Specifically, there is a high probability that image features such as brightness, texture, or colors may vary between different objects, or between different parts of a same object, for example, between wine products and surroundings, between different wine products, or between different parts of a same wine product. In view of this, since a wine product that needs to be managed is within a preset wine product range and a wine label that needs to be recognized is also within a preset wine label range, before the step of automatically recognizing a wine label, after an initial wine product image corresponding to the wine product image is acquired and before the wine label is automatically recognized, the acquired initial wine product image may be segmented to intelligently segment other partial images in the wine product such as an ambient image other than the wine product included in the initial wine product image and a wine bottle other than the wine label, a local image including a preset wine label after the segmentation is taken as an approximate position of a target wine label image, and the target wine label image is taken as the wine product image for wine label recognition. Since a recognized image is focused on a local image including a wine label, a wine product image corresponding to a wine bottle can be accurately recognized especially in a complex environment including a large number of environmental factors such as a wine cellar, so as to obtain a corresponding precise image feature, which can improve accuracy of subsequent wine label recognition, and compared with recognition of an entire initial wine product image, reduce a data processing volume, thereby improving efficiency of wine label recognition.

S32: Perform deep learning recognition on the wine product image according to a preset deep learning recognition manner, to obtain an image feature included in the wine product image.

Deep learning is to establish and simulate a neural network of a human brain for analysis and learning, which imitates a mechanism of the human brain to interpret data. Models of deep learning include feedforward neural networks (FF or FFNN) and perceptrons (P), Boltzmann machines (BM), and the like. A deep learning model with a better recognition effect on wine labels may be selected from a large number of deep learning models through test samples.

Specifically, after the wine product image is acquired, deep learning recognition is performed on the wine product image according to a preset deep learning recognition manner. Deep learning is feature learning (or called representation learning), which is feature engineering, so the image feature included in the wine product image can be obtained through deep learning. Since deep learning is good at learning training sample images and labels corresponding to the training sample images, a pre-trained deep learning model based on deep learning is good at recognizing image features, so as to accurately recognize the image feature included in the wine product image, and the image feature is taken as a target image feature corresponding to the wine product image. For example, when a red wine label of red wine is automatically recognized to manage red wine product information, after a red wine product image corresponding to a red wine product is acquired, deep learning recognition is performed on the red wine product image according to the preset deep learning recognition manner to recognize an image feature included in the red wine product image, and the image feature is taken as a target image feature corresponding to the red wine product image.

A process of training a preset deep learning model corresponding to the preset deep learning recognition manner includes the following steps:

1) A wine label image corresponding to a preset wine product is labeled to obtain a wine label image pre-training sample. The wine label image pre-training sample includes a training wine label image and a training wine label corresponding to the training wine label image. Specifically, a wine label image is shot for a wine label corresponding to a wine product that needs to be managed. Particularly, the wine label image on the wine product is shot from various perspectives, and the shot wine label image is labeled. The so-called labeling is to correspondingly associate the shot wine label image with a wine label name corresponding to the wine label, so as to describe that the wine label image corresponds to the wine label name. The wine label name is a wine label corresponding to the wine label image.

2) The preset deep learning model is trained by using the wine label image pre-training sample. Specifically, the wine label image pre-training sample is inputted to the preset deep learning model, so that the preset deep learning model performs automatic learning according to the training wine label image and the training wine label corresponding to the training wine label image to learn an association relationship between a training image feature and the training wine label that corresponding to the training wine label image, so as to complete the training of the deep learning model.

3) The preset deep learning model is tested by using a wine label image test sample. The wine label image test sample includes a test wine label image and a test wine label corresponding to the test wine label image. Specifically, the trained preset deep learning model is tested by using the wine label image test sample. The preset deep learning model recognizes the test wine label image to obtain a test target wine label, compares the test target wine label with the test wine label corresponding to the test wine label image to determine whether the test target wine label is consistent with the test wine label corresponding to the test wine label image (if the test target wine label is consistent with the test wine label corresponding to the test wine label image, it indicates that the deep learning model has a relatively accurate recognition effect on preset wine label recognition, and if the test target wine label is inconsistent with the test wine label corresponding to the test wine label image, it indicates that the deep learning model does not have a relatively accurate recognition effect on preset wine label recognition) to determine whether the preset deep learning model achieves an expected goal. If the expected goal is achieved, the preset deep learning model is put into a production environment. If the expected goal is not achieved, more training samples, adjusted training samples, and adjusted preset deep learning models are used for re-training until the preset deep learning model finally meets the expected goal.

S33: Select, according to the text and the image feature, a target wine label matching the text and the image feature from a preset wine label database, and take the target wine label as the wine label corresponding to the wine product image.

Specifically, in the case of wine label recognition, since a range of the wine label may be pre-determined, for example, types of wine in the wine cellar may be pre-determined, a preset wine label database may be formed according to wine labels corresponding to wine products that need to be managed, after text and an image feature included in a wine product image are extracted from the wine product image, the text and the image feature may be combined according to the text and the image feature, a wine label matching the text and the image feature is selected from the preset wine label database as a target wine label, and the target wine label is taken as a wine label corresponding to the wine product image, so as to recognize the wine label corresponding to the wine product image and automatically manage wine product information according to the recognized wine label. For example, when wine product information is managed through a red wine cellar, after a red wine product image is acquired, text and an image feature in the red wine product image are recognized, a red wine label corresponding to the red wine product image is recognized according to the text and the image feature, and red wine product information is managed according to the recognized red wine label.

In the embodiments of this application, a wine label generally includes text and an image and different wine labels vary greatly, especially for red wine labels. For red wine produced by different manufacturers, there are huge font differences in font types, character sizes, and languages of the wine labels. Especially in a complex wine cellar environmental condition and in the case of a large number of differences in wine labels such as multiple languages, in implementation of unified automatic management of wine products, when the wine labels are only automatically recognized based on OCR in the conventional technology, in addition to a font difference, a problem of poor compatibility with multinational text also exists, and accuracy of text recognition of the wine labels may be low, resulting in an unstable recognition effect. A conventional deep learning technology has a high demand for training sample data, in order to train a more accurate deep learning recognition model. Image recognition based on the deep learning technology involves a large amount of calculation, and in the case of insufficient training samples, the wine label recognition may be inefficient. In general, for an application environment of wine product information management, it is difficult to accumulate a sufficient number of wine label training data samples. Therefore, it is extremely difficult for the computer device to accurately recognize various wine labels. The applicant in the embodiments of this application, in the face of huge differences between a variety of wine labels and the need for unified and accurate recognition in a complex environment, combines OCR and deep learning image recognition to achieve machine-vision-based automatic recognition of the wine label based on the characteristic that the wine label includes text and an image. Due to full integration of advantages of the OCR and the deep learning recognition, the advantage of the OCR, i.e., fast and precise recognition of standard characters, can be fully utilized, so as to quickly recognize characters with standard fonts included in the wine product image, the advantage of deep learning, i.e., accurate image recognition, can also be fully utilized. By means of deep learning recognition of machine vision, the advantage of the deep learning image recognition is utilized to overcome the disadvantage of the OCR, and at the same time, good compatibility with multi-language text is achieved, so as to make full use of the advantage of the OCR to narrow a search range of deep learning to overcome the disadvantage of the deep learning that requires too much training data and a large amount of calculation for image recognition. At the same time, the image recognition based on deep learning only needs to search from a small search range, which can optimize a network structure of a deep learning model and reduce the system's demand for computing resources. Therefore, it is proposed to combine OCR with deep learning recognition to integrate recognition results of the two recognition manners to realize an intelligent recognition process from rough to fine and accurate for various wine labels, which can improve a recognition speed and accuracy of the wine labels, and can realize real-time and efficient accurate recognition of the wine labels especially for a wine label recognition situation where red wine labels have huge differences in multiple languages and an amount of wine label training sample data cannot be large enough to meet deep learning for training, thereby improving accuracy and efficiency of recognition of wine labels of wine products.

In an embodiment, the step of selecting, according to the text and the image feature, a target wine label matching the text and the image feature from a preset wine label database, and taking the target wine label as the wine label corresponding to the wine product image includes:

selecting, according to the text, preset wine labels matching the text from the preset wine label database, and combining the preset wine labels into a set to obtain a target wine label set; and selecting, according to the image feature, a wine label with the highest degree of matching with the image feature from the target wine label set as the target wine label, and taking the target wine label as the wine label corresponding to the wine product image.

Specifically, after text included in an image is extracted from the image through OCR, preset wine labels matching the text are selected from the preset wine label database according to the text, and the preset wine labels are combined into a set to obtain a target wine label set, so as to make full use of the advantage of the OCR, i.e., fast and accurate recognition of standard text, and narrow a range of wine label search by deep learning to the target wine label set.

Further, in general, a wine label is a combination of text and an image, or recognized text is inaccurate. For example, the recognized text is similar, identical, or included in other text combinations, and a wine label corresponding to the wine product image cannot be accurately determined only through the recognized text. After the target wine label set is obtained, a wine label best matching the image feature is selected from the target wine label set as the target wine label according to the image feature, and the target wine label is taken as a wine label corresponding to the wine product image, so as to recognize the wine label corresponding to the wine product image. The pre-trained deep learning model is more accurate in image recognition. When a range of wine labels searched by the deep learning model has been narrowed to the target wine label set, compared with direct search from the preset wine label database to obtain the target wine label, an amount of calculation of the deep learning model can be greatly reduced, and a defect of low recognition accuracy in complex environments such as wine cellars when an OCR model recognizes text is overcome, so as to select an accurate target wine label from the target wine label set. Therefore, an accurate wine label corresponding to the wine product image can be obtained, which improves accuracy and efficiency of recognition of the wine label corresponding to the wine product image.

Figure 4:
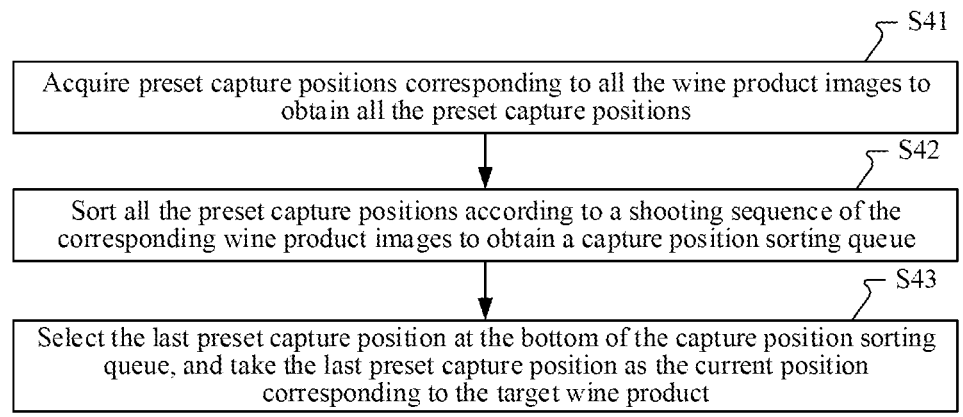
FIG. 4 is a second schematic sub-flowchart of a wine product positioning method according to an embodiment of this application.

Referring to FIG. 4, FIG. 4 is a second schematic sub-flowchart of a wine product positioning method according to an embodiment of this application. As shown in FIG. 4, in this embodiment, the preset camera includes a plurality of cameras. Each camera shoots wine product images corresponding to wine products at different positions, or each camera shoots wine product images corresponding to a wine product at a same position from different angles. Due to diversity of behaviors of moving wine products in the wine cellar, it is impossible to just point an angle that needs to be shot on the wine product to the camera so that the camera can capture accurate and clear wine product images during the movement of the wine product. At a same position, cameras are disposed to shoot the wine product at the position from different angles, inaccurate or unclear shooting of the wine product due to shooting angles of the cameras can be prevented, and clear and accurate wine product images of the wine product at the position can be shot as much as possible, and then the wine product images can be accurately recognized, thereby obtaining accurate wine product information, such as a wine label and a wine product position corresponding to the wine product. When the wine product passes through the position or when the wine product is placed at the position, the wine product image corresponding to the wine product can be shot. The wine product is shot by a plurality of cameras in the wine cellar. The wine product image includes a plurality of images, and the step of acquiring a preset capture position corresponding to the camera, and taking the preset capture position as a current position corresponding to the target wine product includes the following steps:

S41: Acquire preset capture positions corresponding to all the wine product images to obtain all the preset capture positions.

S42: Sort all the preset capture positions according to a shooting sequence of the corresponding wine product images to obtain a capture position sorting queue.

S43: Select the last preset capture position at the bottom of the capture position sorting queue, and take the last preset capture position as the current position corresponding to the target wine product.

Specifically, the wine product image includes a plurality of images, the plurality of images are acquired through a plurality of cameras pre-installed in a preset wine cellar, and the plurality of cameras may be installed at different preset positions in the wine cellar, and when a wine product moves in the wine cellar, a target wine product can be shot from different positions, or a same target wine product can be shot from different angles at a same position. In a wine product information automatic management system, a plurality of cameras may generally be disposed in a wine cellar. For example, in an automatic management system of a red wine cellar, in order to realize wine product information automatic management of red wine products in the wine cellar, a plurality of cameras may generally be disposed in the wine cellar, the plurality of cameras are installed at different preset positions in the wine cellar to shoot a target red wine product from different positions or from different angles at a same position, and pictures or videos of the wine product are acquired through the plurality of cameras pre-installed in the wine cellar, so as to obtain a plurality of wine product images of the wine product. The wine product images include shooting time of the wine product images and preset camera identifiers corresponding to the cameras uploading the wine product images. The preset cameras are preset at preset fixed positions to shoot wine product images corresponding to preset capture positions.

After the plurality of images of the wine product are obtained, the shot wine product images are recognized to recognize a wine label of the target wine product, then preset capture positions corresponding to the wine product images are acquired (a current location of the wine product may be obtained), and all the preset capture positions are sorted based on a shooting sequence of the corresponding wine product images according to the recognized wine label, the preset capture positions corresponding to the wine product images, and a shooting sequence (i.e., a sequence of shooting time) of the wine product images, to obtain a preset capture position sorting queue to obtain a movement trajectory corresponding to the wine product. The above process is iterated until the position of the wine product does not change, the last position is determined as the final position of the wine product, so as to select the last preset capture position at the bottom of the capture position sorting queue, and the last preset capture position is taken as the current position corresponding to the target wine product, realizing the positioning of the wine product. Wine product information is then processed based on the positioning of the wine product, so as to realize automatic management of the target wine product.

For example, in a process of positioning a red wine product in a red wine cellar, referring to Table 1, Table 1 is an example after all the wine product images are sorted. If there are five cameras ABCDE, where the camera A is at a position 1, the camera B is at a position 2, the camera C is at a position 3, the camera D is at a position 4, and the camera E is at a position 5, different positions are connected to form a corresponding path. The path corresponds to movement of an object, which is a movement trajectory. If the wine product sequentially passes through the positions 12345, a movement trajectory of the wine product may be obtained. If the wine product stays at the position 5 and does not move, the end of the movement of the wine product may be determined as the position 5. For example, 12345 is a path, 134 is a path, and 145 may be a path. A specific path may be set according to layout of the wine cellar. Further, if a movement path in the wine cellar is unique, a complete path can be completed according to a known partial path. For example, if there is only the path 1234 from the position 1 to the position 4, even if the movement trajectory corresponding to the wine product is recognized as 134 or 14 from the recognized movement trajectory, a complete movement trajectory of the red wine may also be determined as 1234 according to 134 or 14. Still referring to Table 1, Table 1 is shown as follows:

TABLE 1

| Image sequence | Camera number | | | | |
|---|---|---|---|---|---|
| | Camera A | Camera B | Camera C | Camera D | Camera E |
| 1 | $P_{ATA1}$ | | $P_{CTC1}$ | $P_{DTD1}$ | $P_{ETE1}$ |
| 2 | $P_{ATA2}$ | | $P_{CTC2}$ | | $P_{ETE2}$ |
| 3 | $P_{ATA3}$ | | | | $P_{ETE3}$ |
| 4 | | | | | $P_{ETE4}$ |
| 5 | | | | | $P_{ETE5}$ | where $P_{ATA1}$ is used for describing a wine product image of the camera A at time TA1, $P_{ATA2}$ is used for describing a wine product image of the camera A at time TA2, and so on. It may be known that the camera A includes 3 wine product images recognized to include a same wine label, the camera B does not include an image of a wine label due to blockage, the camera C includes 2 wine product images recognized to include a same wine label, the camera D includes 1 wine product image including a same wine label, and the camera E includes 5 wine product images including a same wine label. The above wine product images are a same wine product. The camera A corresponds to the position 1, the camera B corresponds to the position 2, the camera C corresponds to the position 3, the camera D corresponds to the position 4, and the camera E corresponds to the position 5. As can be seen, a movement trajectory of the wine product is 1345. Alternatively, if the path is unique, although the camera B does not include an image of the wine product, since the positions from 1 to 345 have to pass through the camera B, it may be known that the movement trajectory of the wine product is 12345. Since a position where the wine label is finally recognized is at the position 5 corresponding to the camera E and a preset time has passed, none of the other cameras has recognized the wine label. It can be seen that the final position of the wine product corresponding to the wine label is determined at the position 5 corresponding to the camera E, so as to track a path of movement of the red wine product according to the passed cameras recognizing the red wine label until the final position of the red wine product is determined. If the final position corresponds to a unique position of a wine cabinet, the position of the wine cabinet corresponding to the position of the red wine can be more clearly determined, thereby realizing the positioning of the red wine.

It is to be noted that, based on the wine label recognition method in the above embodiments, the technical features included in different embodiments can be recombined as required to acquire combined implementation solutions, all of which fall within the protection scope of this application.

Figure 5:
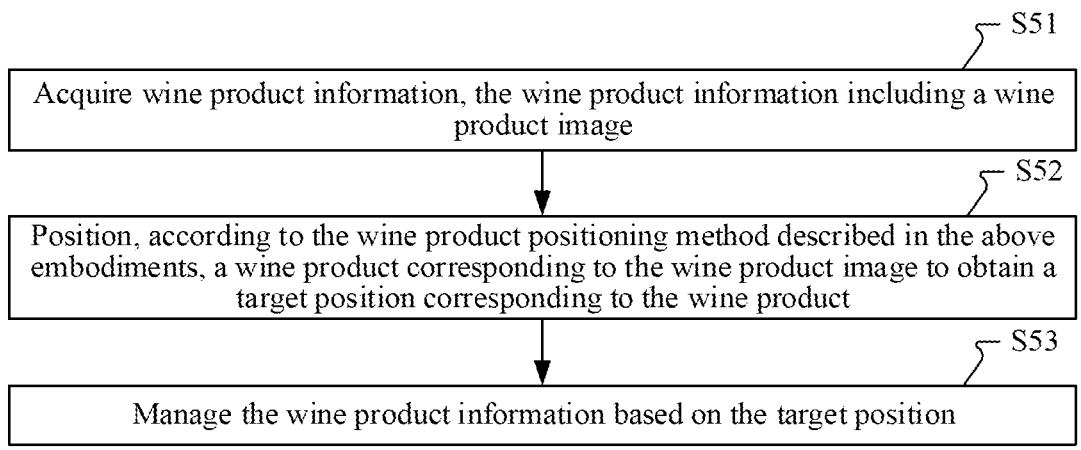
FIG. 5 is a schematic flowchart of a wine product information management method applied to a server side according to an embodiment of this application.

Referring to FIG. 5, FIG. 5 is a schematic flowchart of a wine product information management method applied to a server side according to an embodiment of this application. As shown in FIG. 5, the method includes the following steps S51 to S53:

S51: Acquire wine product information, the wine product information including a wine product image.

S52: Position, according to the wine product positioning method described in the above embodiments, a wine product corresponding to the wine product image to obtain a target position corresponding to the wine product.

S53: Manage the wine product information based on the target position.

Specifically, the server, when performing automatic management on the wine product information corresponding to the wine product, needs to acquire a wine product image to position the wine product corresponding to the wine product image according to the wine product positioning method described in the above embodiments to obtain a wine product position corresponding to the wine product, also needs to acquire other wine product information of the wine product such as year of the wine product, place of origin of the wine product, date of manufacturing, and the time of entering and leaving the wine cellar corresponding to the wine product, and after recognizing a wine label corresponding to the wine product image and the wine product position corresponding to the wine product, adds, modifies, edits, or performs other record operations on the wine product information based on the wine label and the wine product position, so that at which position the wine product is stored in the wine cellar can be subsequently queried to realize automatic management of the wine product. Due to improvement of accuracy and efficiency of wine product positioning, the automatic management of the wine product in the wine cellar can also improve efficiency and accuracy of the automatic management on the wine product based on accurate and quick recognition of wine product positioning. For example, in a wine cellar where red wine is stored, due to accurate and fast positioning of the red wine, real-time, automatic, and high-quality management of the red wine can be performed, thereby improving efficiency of automatic management of the red wine.

Figure 6:
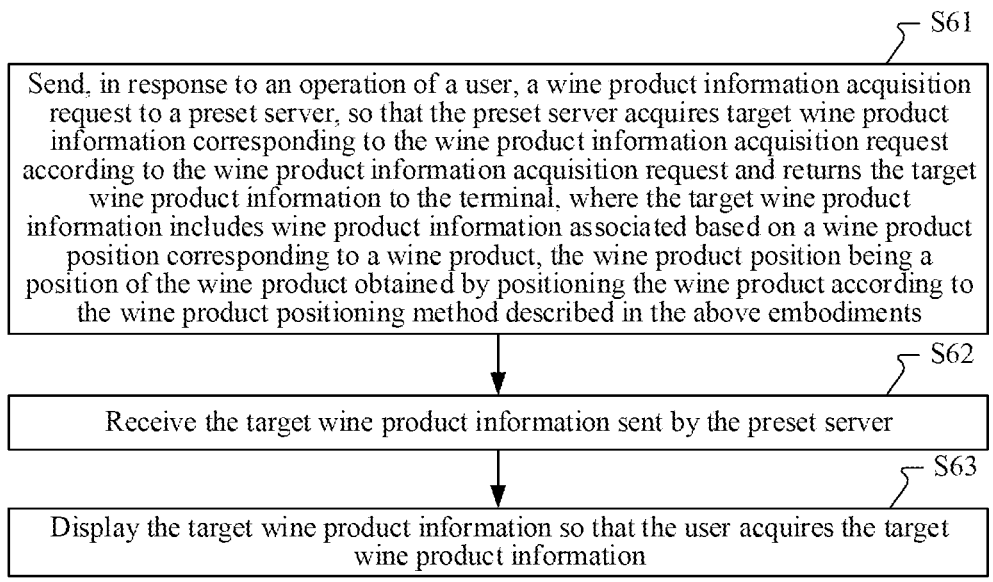
FIG. 6 is a schematic flowchart of a wine product information management method applied to a terminal according to an embodiment of this application.

Referring to FIG. 6, FIG. 6 is a schematic flowchart of a wine product information management method applied to a terminal according to an embodiment of this application. As shown in FIG. 6, the method includes the following steps S61 to S63: S61: Send, in response to an operation of a user, a wine product information acquisition request to a preset server, so that the preset server acquires target wine product information corresponding to the wine product information acquisition request according to the wine product information acquisition request and returns the target wine product information to the terminal, where the target wine product information includes wine product information associated based on a wine product position corresponding to a wine product, the wine product position being a position of the wine product obtained by positioning the wine product according to the wine product positioning method described in the above embodiments.

S62: Receive the target wine product information sent by the preset server.

S63: Display the target wine product information so that the user acquires the target wine product information.

Specifically, when the user queries, modifies, adds, deletes, or performs other edit operations on the wine product information through the terminal, in response to the operation of the user, the terminal sends a wine product information acquisition request to the preset server, so that the preset server acquires target wine product information corresponding to the wine product information acquisition request according to the wine product information acquisition request, and returns the target wine product information to the terminal. The target wine product information includes wine product information associated based on a wine product position corresponding to a wine product, and the wine product position is a position of the wine product obtained by positioning the wine product according to the wine product positioning method described in the above embodiments. The terminal receives the target wine product information sent by the preset server and displays the target wine product information, to enable the user to acquire the target wine product information. Due to improvement of accuracy and efficiency of recognition of positioning of the wine product, when the automatic management of the wine product in the wine cellar is realized based on accurate and rapid recognition of the positioning of the wine product, it is also convenient for the user to improve efficiency, accuracy, and convenience of the automatic management of the wine product. For example, in a wine cellar where red wine is stored, due to accurate and fast positioning of the red wine, real-time, automatic, and high-quality management of the red wine can be performed, which improves efficiency, convenience, and management quality of automatic management of the red wine compared with the wine product management method of manually searching a wine product in a wine cellar in the conventional technology.

Figure 7:
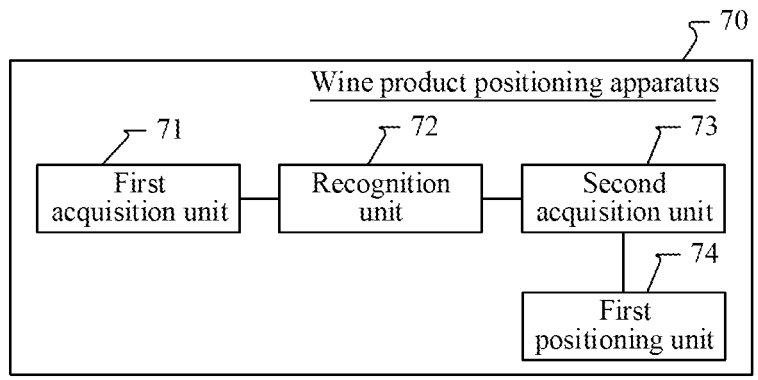
FIG. 7 is a schematic block diagram of a wine product positioning apparatus according to an embodiment of this application.

Referring to FIG. 7, FIG. 7 is a schematic block diagram of a wine product positioning apparatus according to an embodiment of this application. Corresponding to the above wine product positioning method, an embodiment of this application further provides a wine product positioning apparatus. As shown in FIG. 7, the wine product positioning apparatus includes units configured to perform the above wine product positioning method. The wine product positioning apparatus may be configured in a computer device such as a server. Specifically, referring to FIG. 7, the wine product positioning apparatus 70 includes a first acquisition unit 71, a recognition unit 72, a second acquisition unit 73, and a first positioning unit 74.

The first acquisition unit 71 is configured to acquire, based on a preset camera in a wine cellar, a wine product image captured by the preset camera and corresponding to a target wine product.

The recognition unit 72 is configured to recognize, based on a preset wine label recognition method combining OCR and deep learning recognition, the wine product image to obtain a wine label corresponding to the wine product image.

The second acquisition unit 73 is configured to acquire a preset capture position corresponding to the camera, and take the preset capture position as a current position corresponding to the target wine product.

The first positioning unit 74 is configured to describe a position corresponding to the target wine product by using the wine label and the current position, to position the target wine product.

In an embodiment, the recognition unit 72 includes:

a first recognition subunit configured to perform OCR on the wine product image according to a preset OCR manner, to obtain text included in the wine product image;

a second recognition subunit configured to perform deep learning recognition on the wine product image according to a preset deep learning recognition manner, to obtain an image feature included in the wine product image; and a first selection subunit configured to select, according to the text and the image feature, a target wine label matching the text and the image feature from a preset wine label database, and take the target wine label as the wine label corresponding to the wine product image.

In an embodiment, the second acquisition unit 73 includes:

a first acquisition subunit configured to acquire preset capture positions corresponding to all the wine product images to obtain all the preset capture positions;

a sorting subunit configured to sort all the preset capture positions according to a shooting sequence of the corresponding wine product images to obtain a capture position sorting queue; and a second selection subunit configured to select the last preset capture position at the bottom of the capture position sorting queue, and take the last preset capture position as the current position corresponding to the target wine product.

Figure 8:
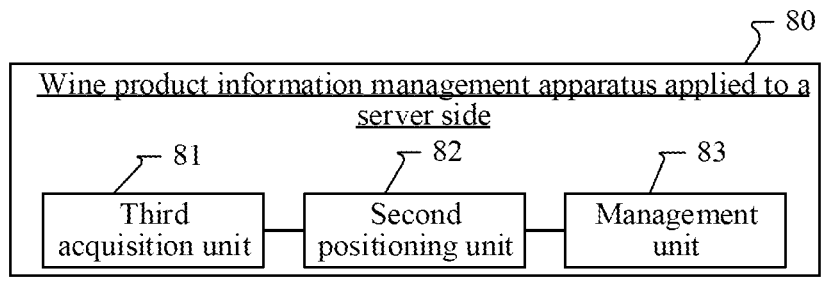
FIG. 8 is a schematic block diagram of a wine product information management apparatus applied to a server side according to an embodiment of this application.

Referring to FIG. 8, FIG. 8 is a schematic block diagram of a wine product information management apparatus applied to a server side according to an embodiment of this application. Corresponding to the above wine product information management method applied to a server side, an embodiment of this application further provides a wine product information management apparatus applied to a server side. As shown in FIG. 8, the wine product information management apparatus 80 applied to a server side includes units configured to perform the above wine product information management method applied to a server side. The wine product information management apparatus 80 may be configured in a computer device such as a server. Specifically, referring to FIG. 8, the wine product information management apparatus 80 includes a third acquisition unit 81, a second positioning unit 82, and a management unit 83.

The third acquisition unit 81 is configured to acquire wine product information, the wine product information including a wine product image. The second positioning unit 82 is configured to position, according to the wine product positioning method described in the above embodiments, a wine product corresponding to the wine product image to obtain a target position corresponding to the wine product. The management unit 83 is configured to manage the wine product information based on the target position.

Figure 9:
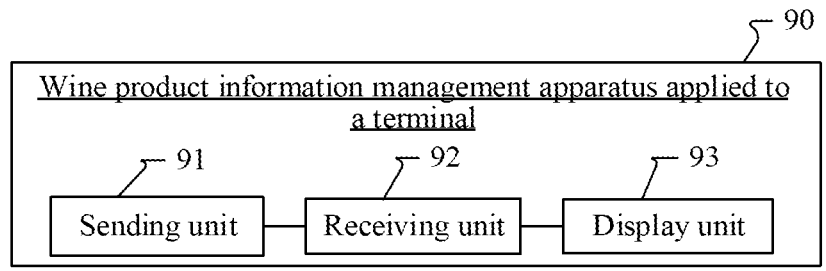
FIG. 9 is a schematic block diagram of a wine product information management apparatus applied to a terminal according to an embodiment of this application.

Referring to FIG. 9, FIG. 9 is a schematic block diagram of a wine product information management apparatus applied to a terminal according to an embodiment of this application. Corresponding to the above wine product information management method applied to a terminal, an embodiment of this application further provides a wine product information management apparatus applied to a terminal. As shown in FIG. 9, the wine product information management apparatus 90 applied to a terminal includes units configured to perform the above wine product information management method applied to a terminal. The wine product information management apparatus 90 may be configured in a terminal device such as a smart phone. Specifically, referring to FIG. 9, the wine product information management apparatus 90 includes a sending unit 91, a receiving unit 92, and a display unit 93.

The sending unit 91 is configured to send, in response to an operation of a user, a wine product information acquisition request to a preset server, so that the preset server acquires target wine product information corresponding to the wine product information acquisition request according to the wine product information acquisition request and returns the target wine product information to the terminal, where the target wine product information includes wine product information associated based on a wine product position corresponding to a wine product, the wine product position being a position of the wine product obtained by positioning the wine product according to the wine product positioning method described in the above embodiments. The receiving unit 92 is configured to receive the target wine product information sent by the preset server. The display unit 93 is configured to display the target wine product information so that the user acquires the target wine product information.

An embodiment of this application further provides a wine product information management system. The system includes a wine cellar, a terminal, and a server. The wine cellar is provided with a wine cabinet. The wine cabinet is configured to place wine products. The wine cellar is provided with cameras at preset positions, so as to shoot wine product images corresponding to the wine products through the cameras and upload the wine product images to the server. The server is configured to perform steps of the wine product information management method applied to a server side described in the above embodiments. The terminal is configured to perform steps of the wine product information management method applied to a terminal described in the above embodiments.

It is to be noted that, a person skilled in the art can clearly understand that specific implementation processes of the above wine product positioning apparatus and units, specific implementation processes of the above wine product information management apparatus applied to a server side and units, and specific implementation processes of the above wine product information management apparatus applied to a terminal and units may be obtained with reference to the corresponding description in the corresponding method embodiments in the foregoing embodiments. Details are not described herein again for convenience and conciseness of description.

At the same time, the division and connection manners of the units in the above wine product positioning apparatus, the above wine product information management apparatus applied to a server side, or the above wine product information management apparatus applied to a terminal are for illustration only. In another embodiment, the above wine product positioning apparatus, the above wine product information management apparatus applied to a server side, or the above wine product information management apparatus applied to a terminal may be divided into different units as required, or the units in the above wine product positioning apparatus, the above wine product information management apparatus applied to a server side, or the above wine product information management apparatus applied to a terminal adopt different connection sequences and manners to complete all or some functions of the above wine product positioning apparatus, the above wine product information management apparatus applied to a server side, or the above wine product information management apparatus applied to a terminal.

The above wine product positioning apparatus, the above wine product information management apparatus applied to a server side, or the above wine product information management apparatus applied to a terminal may be implemented as a form of a computer program. The computer program may run on a computer device as shown in FIG. 10.

Figure 10:
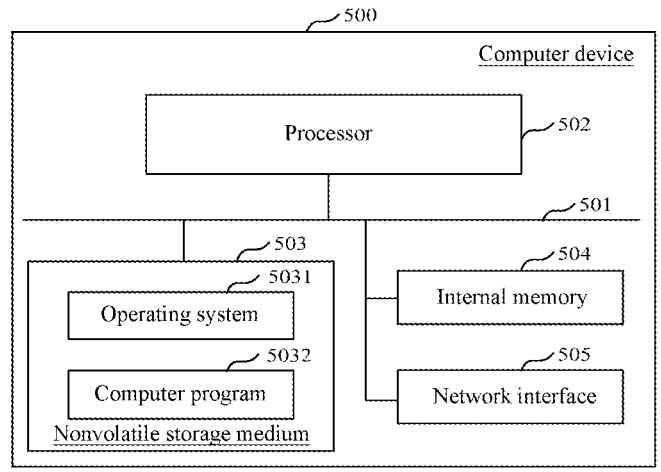
FIG. 10 is a schematic block diagram of a computer device according to an embodiment of this application.

Referring to FIG. 10, FIG. 10 is a schematic block diagram of a computer device according to an embodiment of this application. The computer device 500 may be a computer device such as a desktop computer or a server, or may be a component or part in another device.

Referring to FIG. 10, the computer device 500 includes a processor 502, a memory, and a network interface 505 connected through a system bus 501. The memory may include a nonvolatile storage medium 503 and an internal memory 504, and the memory may also be a volatile computer-readable storage medium.

The nonvolatile storage medium 503 may store an operating system 5031 and a computer program 5032. The computer program 5032, when executed, may cause the processor 502 to perform one of the above wine product positioning method, the above wine product information management method applied to a server side, and the above wine product information management method applied to a terminal. The processor 502 is configured to provide computing and control capabilities to support running of the entire computer device 500. The internal memory 504 provides an environment for running of the computer program 5032 in the nonvolatile storage medium 503. The computer program 5032, when executed by the processor 502, may cause the processor 502 to perform one of the above wine product positioning method, the above wine product information management method applied to a server side, and the above wine product information management method applied to a terminal. The network interface 505 is configured for network communication with another device. A person skilled in the art may understand that the structure shown in FIG. 10 is only a block diagram of a partial structure related to a solution in this application, and does not constitute a limitation to the computer device 500 to which the solution in this application is applied. Specifically, the computer device 500 may include more parts or fewer parts than those shown in the figure, or some parts may be combined, or a different part deployment may be used. For example, in some embodiments, the computer device may include only a memory and a processor. In such embodiments, structures and functions of the memory and the processor are the same as those in the embodiment shown in FIG. 10. Details are not described herein again.

In an embodiment, when the processor 502 is configured to run the computer program 5032 stored in the memory to implement the above wine product positioning method, the processor 502 performs the following steps: acquiring, based on a preset camera in a wine cellar, a wine product image captured by the preset camera and corresponding to a target wine product; recognizing, based on a preset wine label recognition method combining OCR and deep learning recognition, the wine product image to obtain a wine label corresponding to the wine product image; acquiring a preset capture position corresponding to the camera, and taking the preset capture position as a current position corresponding to the target wine product; and describing a position corresponding to the target wine product by using the wine label and the current position, to position the target wine product.

In an embodiment, when implementing the step of recognizing, based on a preset wine label recognition method combining OCR and deep learning recognition, the wine product image to obtain a wine label corresponding to the wine product image, the processor 502 specifically implements the following steps:

performing OCR on the wine product image according to a preset OCR manner, to obtain text included in the wine product image;

performing deep learning recognition on the wine product image according to a preset deep learning recognition manner, to obtain an image feature included in the wine product image; and selecting, according to the text and the image feature, a target wine label matching the text and the image feature from a preset wine label database, and taking the target wine label as the wine label corresponding to the wine product image.

In an embodiment, the preset camera includes a plurality of cameras, the wine product image includes a plurality of images, and when implementing the step of acquiring a preset capture position corresponding to the camera, and taking the preset capture position as a current position corresponding to the target wine product, the processor 502 specifically implements the following steps:

acquiring preset capture positions corresponding to all the wine product images to obtain all the preset capture positions;

sorting all the preset capture positions according to a shooting sequence of the corresponding wine product images to obtain a capture position sorting queue; and selecting the last preset capture position at the bottom of the capture position sorting queue, and taking the last preset capture position as the current position corresponding to the target wine product.

In an embodiment, when the processor 502 is configured to run the computer program 5032 stored in the memory to implement the above wine product information management method applied to a server side, the processor 502 performs the following steps: acquiring wine product information, the wine product information including a wine product image; positioning, according to the wine product positioning method described in the above embodiments, a wine product corresponding to the wine product image to obtain a target position corresponding to the wine product; and managing the wine product information based on the target position.

In an embodiment, when the processor 502 is configured to run the computer program 5032 stored in the memory to implement the above wine product information management method applied to a terminal, the processor 502 performs the following steps: sending, in response to an operation of a user, a wine product information acquisition request to a preset server, so that the preset server acquires target wine product information corresponding to the wine product information acquisition request according to the wine product information acquisition request and returns the target wine product information to the terminal, where the target wine product information includes wine product information associated based on a wine product position corresponding to a wine product, the wine product position being a position of the wine product obtained by positioning the wine product according to the wine product positioning method described in the above embodiments; receiving the target wine product information sent by the preset server; and displaying the target wine product information so that the user acquires the target wine product information.

It should be understood that in the embodiments of this application, the processor 502 may be a central processing unit (CPU), or the processor 502 may be another general-purpose processor, a digital signal processor (DSP), an application specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like.

A person of ordinary skill in the art may understand that all or some of the procedures of the methods of the foregoing embodiments may be implemented by a computer program. The computer program may be stored in a computer-readable storage medium. The computer program is executed by at least one processor in a computer system to implement steps in the procedures of the foregoing method embodiments.

Therefore, this application further provides a computer-readable storage medium. The computer-readable storage medium may be a nonvolatile computer-readable storage medium or a volatile computer-readable storage medium. The computer-readable storage medium stores a computer program. The computer program, when executed by a processor, causes the processor to perform steps of the wine product positioning method described in the above embodiments, or causes the processor to perform steps of the wine product information management method applied to a server side described in the above embodiments, or causes the processor to perform steps of the wine product information management method applied to a terminal described in the above embodiments.

The computer-readable storage medium may be an internal storage unit of the foregoing device, for example, a hard disk or memory of the device. The computer-readable storage medium may also be an external storage device of the device, such as an insertion-type hard disk drive, a smart media card (SMC), a secure digital (SD) card, and a flash card configured on the device. Further, the computer-readable storage medium may further include both the internal storage unit and the external storage device of the device.

A person skilled in the art can clearly understand that for convenience and conciseness of description, for specific working processes of the foregoing devices, apparatuses and units, reference may be made to the corresponding processes in the foregoing method embodiments, and details are not described herein again.

The storage medium is a physical, non-transient storage medium, which may be, for example, a USB disk, a mobile hard disk, a read-only memory (ROM), a magnetic disk, or an optical disk, and other physical storage media that can store computer programs.

A person of ordinary skill in the art may be aware that, in combination with the examples described in the embodiments disclosed herein, units and algorithm steps can be implemented by electronic hardware, computer software, or a combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. A person skilled in the art can use different methods to implement the described functions for each particular application, but it should not be considered that the implementation goes beyond the scope of this application.

In the several embodiments provided in this application, it should be understood that the disclosed apparatus and method may be implemented in other manners. For example, the apparatus embodiment described above is merely an example. For example, the division of units is merely logical function division and may be other division in actual implementation. For example, a plurality of units or components may be combined or integrated into another system, or some features may be ignored or not performed.

The steps in the methods in the embodiments of this application may be sequentially adjusted, combined, and deleted according to an actual requirement. The units in the apparatus in the embodiments of this application may be combined, divided, and deleted according to an actual requirement. In addition, functional units in the embodiments of this application may be integrated into one processing unit, or each of the units may physically exist alone, or two or more units may be integrated into one unit.

When the integrated unit is implemented in the form of a software functional unit and sold or used as an independent product, the integrated unit may be stored in a storage medium. Based on such an understanding, the technical solutions of this application essentially, or the part contributing to the existing technology, or all or some of the technical solutions may be implemented in the form of a software product. The computer software product is stored in a storage medium and includes several instructions for instructing an electronic device (which may be a personal computer, a terminal, a network device, or the like) to perform all or some of the steps of the methods described in the embodiments of this application.

The foregoing descriptions are merely a specific implementation of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wine product positioning method, comprising:
   acquiring, based on a preset camera in a wine cellar, a wine product image captured by the preset camera and corresponding to a target wine product;
   recognizing, based on a preset wine label recognition method combining optical character recognition (OCR) and deep learning recognition, the wine product image to obtain a wine label corresponding to the wine product image;
   acquiring a preset capture position corresponding to the camera, and taking the preset capture position as a current position corresponding to the target wine product; and
   describing a position corresponding to the target wine product by using the wine label and the current position, to position the target wine product.

2. The wine product positioning method according to claim 1, wherein the step of recognizing, based on a preset wine label recognition method combining OCR and deep learning recognition, the wine product image to obtain a wine label corresponding to the wine product image comprises:
   performing OCR on the wine product image according to a preset OCR manner, to obtain text comprised in the wine product image;
   performing deep learning recognition on the wine product image according to a preset deep learning recognition manner, to obtain an image feature comprised in the wine product image; and
   selecting, according to the text and the image feature, a target wine label matching the text and the image feature from a preset wine label database, and taking the target wine label as the wine label corresponding to the wine product image.

3. The wine product positioning method according to claim 1, wherein the preset camera comprises a plurality of cameras, the wine product image comprises a plurality of images, and the step of acquiring a preset capture position corresponding to the camera, and taking the preset capture position as a current position corresponding to the target wine product comprises:
   acquiring preset capture positions corresponding to all the wine product images to obtain all the preset capture positions;
   sorting all the preset capture positions according to a shooting sequence of the corresponding wine product images to obtain a capture position sorting queue; and
   selecting the last preset capture position at the bottom of the capture position sorting queue, and taking the last preset capture position as the current position corresponding to the target wine product.

4. The wine product positioning method according to claim 2, wherein the preset camera comprises a plurality of cameras, the wine product image comprises a plurality of images, and the step of acquiring a preset capture position corresponding to the camera, and taking the preset capture position as a current position corresponding to the target wine product comprises:
   acquiring preset capture positions corresponding to all the wine product images to obtain all the preset capture positions;
   sorting all the preset capture positions according to a shooting sequence of the corresponding wine product images to obtain a capture position sorting queue; and
   selecting the last preset capture position at the bottom of the capture position sorting queue, and taking the last preset capture position as the current position corresponding to the target wine product.

5. A wine product information management method, applied to a terminal, the method comprising:
   sending, in response to an operation of a user, a wine product information acquisition request to a preset server, so that the preset server acquires target wine product information corresponding to the wine product information acquisition request according to the wine product information acquisition request and returns the target wine product information to the terminal, wherein the target wine product information comprises wine product information associated based on a wine product position corresponding to a wine product, the wine product position being a position of the wine product obtained by positioning the wine product according to the wine product positioning method according to claim 1;
   receiving the target wine product information sent by the preset server; and
   displaying the target wine product information so that the user acquires the target wine product information.

6. A computer device, wherein the computer device comprises a memory and a processor connected to the memory; the memory being configured to store a computer program; and the processor being configured to run the computer program to perform steps of the method according to claim 1.

* * * * *